(12) United States Patent
Roque Marceneiro et al.

(10) Patent No.: US 12,350,909 B2
(45) Date of Patent: Jul. 8, 2025

(54) THERMAL STABILIZER MATERIAL, METHOD OF OBTAINING AND USES THEREOF

(71) Applicant: TMG Tecidos Plastificados E Outros Revestimentos Para A Industria Automovel SA, Vila Nova De Famalicão—São Cosme Vale (PT)

(72) Inventors: Sofia Daniela Roque Marceneiro, Coimbra (PT); Ana Maria Antunes Dias, Coimbra (PT); Hermínio José Cipriano De Sousa, Coimbra (PT); Isabel Dias, Ponte (PT); Irene Lobo, Ponte (PT); Elizabete Pinho, Ponte (PT)

(73) Assignee: TMG TECIDOS PLASTIFICADOS E OUTROS REVESTIMENTOS PARA A INDUSTRIA AUTOMOVEL SA, Vila Nova De Famalicão—São Cosme Vale (PT)

( * ) Notice: Subject to any disclaimer, the term of this patent is extended or adjusted under 35 U.S.C. 154(b) by 536 days.

(21) Appl. No.: 17/762,343

(22) PCT Filed: Sep. 28, 2020

(86) PCT No.: PCT/IB2020/059056
§ 371 (c)(1),
(2) Date: Mar. 21, 2022

(87) PCT Pub. No.: WO2021/059252
PCT Pub. Date: Apr. 1, 2021

(65) Prior Publication Data
US 2022/0363043 A1 Nov. 17, 2022

(30) Foreign Application Priority Data

Sep. 26, 2019 (PT) .......................................... 115797
Nov. 15, 2019 (EP) .................................... 19209584

(51) Int. Cl.
| | | |
|---|---|---|
| B32B 5/18 | (2006.01) |
| B32B 5/02 | (2006.01) |
| B32B 5/16 | (2006.01) |
| B32B 5/24 | (2006.01) |
| B32B 7/12 | (2006.01) |
| B32B 27/06 | (2006.01) |
| B32B 27/08 | (2006.01) |
| B32B 27/22 | (2006.01) |
| B32B 27/30 | (2006.01) |
| D06N 3/00 | (2006.01) |
| D06N 3/06 | (2006.01) |

(52) U.S. Cl.
CPC ............ *B32B 27/304* (2013.01); *B32B 5/022* (2013.01); *B32B 5/026* (2013.01); *B32B 5/16* (2013.01); *B32B 5/245* (2013.01); *B32B 7/12* (2013.01); *B32B 27/065* (2013.01); *B32B 27/08* (2013.01); *B32B 27/22* (2013.01); *D06N 3/0061* (2013.01); *D06N 3/06* (2013.01); *B32B 2250/03* (2013.01); *B32B 2250/04* (2013.01); *B32B 2250/05* (2013.01); *B32B 2255/102* (2013.01); *B32B 2255/26* (2013.01); *B32B 2264/08* (2013.01); *B32B 2264/104* (2013.01); *B32B 2264/12* (2013.01); *B32B 2264/30* (2020.08); *B32B 2264/303* (2020.08); *B32B 2266/0235* (2013.01); *B32B 2272/00* (2013.01); *B32B 2307/552* (2013.01); *B32B 2307/558* (2013.01); *B32B 2307/71* (2013.01); *B32B 2601/00* (2013.01); *B32B 2605/003* (2013.01); *D06N 2213/03* (2013.01)

(58) Field of Classification Search
None
See application file for complete search history.

(56) References Cited

U.S. PATENT DOCUMENTS

2012/0258303 A1    10/2012   Bühring et al.

FOREIGN PATENT DOCUMENTS

| CN | 102995448 B | 5/2014 |
| CN | 104278539 A | 1/2015 |
| CN | 105297474 A | 2/2016 |
| EP | 1908576 A1 | 4/2008 |
| EP | 2357276 A1 | 8/2011 |
| WO | 2017202510 A1 | 2/2017 |

OTHER PUBLICATIONS

Sharmeeni Murugan et al., "Effects of chicken eggshell filler size on the processing, mechanical and thermal properties of PVC matrix composite" Plastics, Rubber and Composites, Jan. 2017, pp. 42-51.
International Search Report in corresponding PCT Application No. PCT/IB2020/059056 mailed on Jan. 28, 2021.

*Primary Examiner* — Sheeba Ahmed
(74) *Attorney, Agent, or Firm* — Leason Ellis LLP

(57) ABSTRACT

The present disclosure relates to the use of eggshell particles as a polymer thermal stabilizer, preferably as a poly(vinyl chloride) (PVC) thermal stabilizer; also to a flexible material comprising a multi-layered PVC-based material, method of obtaining and uses thereof.

An aspect of the present disclosure relates to a material comprising a poly(vinyl chloride), PVC, layer comprising eggshell particles, wherein the eggshell particle size is up to 200 μm, an intermediate layer or a plurality of intermediate layers; a support layer selected from the following list: fabric, knitted fabric, nonwoven, foam, or mixtures thereof; wherein the layers are bounded. Preferably a material solution free of azodicarbonamide, for automotive Interiors—Eco-friendlier, preferably sustainable artificial leather for automotive upholsteries.

15 Claims, 4 Drawing Sheets

THERMAL STABILIZER MATERIAL, METHOD OF OBTAINING AND USES THEREOF

CROSS-REFERENCE TO RELATED APPLICATIONS

This application is a U.S. National Stage Application under 35 U.S.C. § 371 of International Patent Application No. PCT/IB2020/059056, filed Sep. 28, 2020, which claims priority to Portugal Patent Application No. 115797, filed Sep. 26, 2019 and EP Application Ser. No. 19/209,584.2, filed Nov. 15, 2019, the contents of which are each hereby incorporated by reference in their respective entireties.

TECHNICAL FIELD

The present disclosure relates to the use of eggshell particles as a polymer thermal stabilizer, preferably as a poly(vinyl chloride) (PVC) thermal stabilizer; also to a flexible material comprising a multi-layered PVC-based material, method of obtaining and uses thereof.

The production of a thermal stabilizer for PVC layer using eggshells as a source of an eco-friendly additive for PVC-based composites, preferably ADCA—material solution free of azodicarbonamide, for automotive Interiors—Eco-friendlier, preferably sustainable artificial leather for automotive upholsteries.

BACKGROUND

Document EP2357276 discloses a multi-layer textile sheet and method for its production; describes a multilayer sheet, comprising at least one textile support layer, at least one foamed layer of plasticized poly(vinyl chloride), at least one cover layer of plasticized poly(vinyl chloride) and at least one outwardly facing lacquer layer on the cover layer, characterized in that the poly(vinyl chloride) content in the top layer is at least 50% by weight based on a poly(vinyl chloride) prepared by the suspension polymerization method (S-PVC), and the top layer composition is a calcium hydroxide stabilizer and/or a Ca/Zn Stabilizer containing 1 to 3% by weight of calcium and 1 to 2% by weight of zinc.

Document WO2017202510 discloses a deep drawn multilayer sheet material describes a deep-drawn multilayer sheet material comprising at least one substrate layer and a PVC-based foamed layer. The deep-drawn multilayer sheet material is used as an interior trim part for a vehicle. The foamed PVC layer contains hollow microbeads, especially in order to reduce unpleasant odors.

These facts are disclosed in order to illustrate the technical problem addressed by the present disclosure.

GENERAL DESCRIPTION

An aspect of the present disclosure relates a poly(vinyl chloride), PVC, layer (or PVC compact layer) comprising eggshell particles; wherein the eggshell particle size is up to 200 µm.

The present disclosure relates to material comprising a poly(vinyl chloride), PVC, layer comprising eggshell particles; wherein the eggshell particle size is up to 200 µm The present disclosure further relates to a material comprising:
 a poly(vinyl chloride), PVC, layer (or PVC compact layer) comprising eggshell particles;
 a support layer selected from the following list: fabric, knitted fabric, nonwoven, foam, or combinations thereof;
 and optionally an intermediate layer or a plurality of intermediate layers;
 wherein the layers are bounded;
 and wherein the eggshell particle size is up to 200 µm.

Another aspect of the present disclosure relates to a material comprising a poly(vinyl chloride), PVC, layer (or PVC compact layer) comprising eggshell particles, wherein the eggshell particle size is up to 200 µm, an intermediate layer or a plurality of intermediate layers; a support layer selected from the following list: fabric, knitted fabric, nonwoven, foam, or mixtures thereof; wherein the layers are bounded, preferably wherein the plurality of intermediate layers is a foam layer and/or an adhesive layer.

The particle size distribution may be measured by different test methods, in the present disclosure particle size and particle size distribution were measured by Laser Diffraction Spectroscopy (LDS) (Mastersizer 2000, Malvern Instruments, UK) with the solid particles dispersed at 1 wt % in milli-Q water with 1% (v/v) of Tween® 20, or by electrophoretic light scattering using a Zetasizer Nano ZS (Malvern Instruments, Malvern, U.K.) for measurements at nano scale.

Moreover, the present subject-matter describes a technical solution to prevent PVC yellowing by using a natural-origin solvent-free thermal stabilizer. Furthermore, this natural-origin solvent-free additive also proved to reduce VOC emissions from the multi-layered PVC-based composites.

The material of the present disclosure surprisingly shows an improved PVC thermal stability, as well as reduces VOC emissions; and also maintaining the aging resistance of the material.

One of the problems of the present disclosure was solved by replacing commercial solvent-based stabilizers by novel sustainable and natural-origin solvent-free stabilizers into PVC-based formulations. Those stabilizers are obtained from eggshell powders which can be used alone or combined with calcium/zinc soaps of epoxidized soybean oil (ESO) and epoxidized linseed oil (ELO). In an embodiment, the multi-layered PVC-based material is composed by a layer, a foam layer, an adhesive layer and a support layer.

The material of the present disclosure has the advantage of using an industrial food waste, namely eggshell particles, as a surprisingly efficient thermal stabilizer, reduces VOC and FOG emissions, maintaining the colour fastness and improves the aging resistance of the material.

In an embodiment, for better results, the amount of eggshell particles of the PVC layer is up to 20% ($wt_{eggshell}/wt_{PVC\ layer}$), preferably is up to 10% ($wt_{eggshell}/wt_{PVC\ layer}$).

In an embodiment, for better results, the amount of eggshell particles of the PVC layer is from 0.2-5% ($wt_{eggshell}/wt_{PVC\ layer}$), preferably from 0.2-3% ($wt_{eggshell}/wt_{PVC\ layer}$), more preferably from 0.2-2% ($wt_{eggshell}/wt_{PVC\ layer}$)

In an embodiment, for better results, the heat aging is graded as 4-5, using grey scale according ISO 105-A02: 1993/Cor 2:2005. In an embodiment, the heat aging of PVC films (3×2) cm can be measured by different methods; in the present, the measurement of the heat aging of PVC films was performed using a ventilated oven at 100° C. for 240 h and 500 h and evaluated through periodic colour measurements. Colour measurements were performed using a Colour Spectrophotometer: film specimens were placed on a white standard plate and the lightness (L) and chromaticity parameters "a" (red-green) and "b" (yellow-blue) were measured.

Grey scale result is the evaluation of differences in colour shading of a material's appearance. Grey scale is used in the assessment of change in colour, occurring in both heat aging testing, as described in ISO 105-A02:1993/Cor 2:2005. A tool, known as a grey scale, is used to visually assess and compare the change of colour of a specimen by identifying a half-step rating from 5 to 1, corresponding 5 to small colour change and 1 to a strong colour change. This grey scale includes also half-step values. Using the Spectrophotometer, three measurements were taken on different locations of each sample (3×2) cm and the averages were used for data analysis. DL, Da, and db are the difference from initial and final values of "L", "a", and "b" during heat aging experiments.

In an embodiment, for better results, the VOC/FOG emission reduction is from 5 and 25%; the VOC/FOG emission was measured according to the method described in VDA 278:2011.

In an embodiment, for better results, the eggshell particles d50 (maximum particle diameter below which 50% of the sample volume exists) is from 1.0 to 20 The particle size distribution may be measured by laser diffraction spectroscopy (LDS) (Mastersizer 2000, Malvern Instruments, UK).

In an embodiment, for better results, the eggshell particles d90 (maximum particle diameter below which 90% of the sample volume exists) is from 4.0 to 150 μm. The particle size distribution may be measured by laser diffraction spectroscopy (LDS) (Mastersizer 2000, Malvern Instruments, UK).

In an embodiment, for better results, the material of the present disclosure may comprise a poly(vinyl chloride), PVC, layer comprising eggshell particles; wherein the plurality of intermediate layers is a foam layer; an adhesive layer; and a support layer selected from the following list: fabric, knitted fabric, nonwoven, foam, or mixtures thereof; wherein the layers are bounded.

In an embodiment, for better results, the foam layer and/or adhesive layer may further comprise eggshell particles.

In an embodiment, for better results, the amount of eggshell particles of the foam layer may be from 0.2-5% ($wt_{eggshell}/wt_{foam\ layer}$), preferably from 0.2-3% ($wt_{eggshell}/wt_{foam\ layer}$), more preferably from 0.2-2% ($wt_{eggshell}/wt_{foam\ layer}$).

In an embodiment, for better results, the amount of eggshell particles of the adhesive layer may be from 0.2-5% (wt eggshell/wt adhesive layer), preferably from 0.2-3% ($wt_{eggshell}/wt_{adhesive\ layer}$), more preferably from 0.2-2% ($wt_{eggshell}/wt_{adhesive\ layer}$).

In an embodiment, for better results, the poly(vinyl chloride) layer, and/or the foam layer and/or adhesive layer may comprise polymeric microspheres, preferably in the foam layer.

In an embodiment, for better results, the polymeric microsphere may be an expandable material, preferably Expancel™ from Akzo Nobel; Unicell™ from Tramaco; Advancell™ from Sekisui.

In an embodiment, for better results, the microspheres particle diameter is from 1-50 μm, preferably 5-40 μm.

In an embodiment, for better results, the microspheres amount is from 0.1-20 phr (parts per hundred resin), preferably 1.5-10 phr.

In an embodiment, for better results, any layer may comprise sublayers.

In an embodiment for better results, the eggshell particles may be from bird/poultry eggs, particularly from chicken, turkey, ostrich, quail, goose or duck.

In an embodiment for better results, the material is a flexible material. The flexible material is resistant to impact (loop) and fatigue to flexing (flexometer method) according to VDA 230-225:2014 standard. The flexible composite material applied to upholsteries for automobiles presents good crack resistance after 100.000 flexural cycles at ambient temperature and 10.000 flexural cycles at −10° C., preferably −20° C. (by the VDA 230-225:2014 method).

Another aspect, of the present disclosure is a composite material comprising the material of the present disclosure. The composite material of the present disclosure may be used in automotive interior trim, namely upholstery, or a seat; or door panel, or instrument panel.

Another aspect, of the present disclosure relates to the use of the eggshell particles described in any of the previous claims as a PVC thermal stabilizer.

Another aspect, of the present disclosure relates to a method for obtaining the PVC thermal stabilizer layer of the present disclosure that may comprise the following steps:
  obtaining the eggshell particles comprising a size up to 200 μm;
  optionally obtaining a metal soap of calcium and zinc salts and mixing the eggshell particles and the metal soap;
  add eggshell particles or the mixture to a PVC paste to obtain a PVC layer;
  binding the obtained PVC layer to an intermediate layer or the plurality of intermediate layers and to a support layer selected from the following list: fabric, knitted fabric, nonwoven, foam, or mixtures thereof.

In an embodiment, the metal soap may comprise epoxidized oils, preferably the epoxidized vegetable oils are epoxidized soybean oil (ESO) and/or epoxidized linseed oil (ELO).

In an embodiment, the metal salts may be selected from the list: zinc acetate ($Zn(Ac)_2$), zinc sulfate ($ZnSO_4$), calcium acetate ($Ca(Ac)_2$), calcium nitrate ($Ca(NO_3)_2$), calcium hydroxide ($Ca(OH)_2$), $Ca(NO_3)_2/Ca(OH)_2$ or $Ca(Ac)_2/Ca(OH)_2$ mixture, or mixtures thereof.

Another aspect of the present disclosures relates to a material comprising a polyvinyl chloride), PVC, layer comprising polymeric microspheres wherein the polymeric microspheres comprising an expandable material, optionally an intermediate layer or a plurality of intermediate layers; optionally a support layer selected from the following list: fabric, knitted fabric, nonwoven, foam, or mixtures thereof; wherein the layers are bounded. Preferably a flexible material, more preferably a flexible material able to be use artificial leather in the automotive industry, more preferably upholstery or a seat or door panel or automotive interior trim.

In an embodiment, for better results, the polymeric microsphere may be an expandable material, preferably Expancel™ from Akzo Nobel; Unicell™ from Tramaco; Advancell™ from Sekisui.

In an embodiment, for better results, the microspheres particle diameter is from 1-50 μm, preferably 5-40 μm.

In an embodiment, for better results, the microspheres amount is from 0.1-20 phr (parts per hundred resin), preferably 1.5-10 phr.

In an embodiment, for better results, any layer may comprise sublayers.

BRIEF DESCRIPTION OF THE DRAWINGS

The following figures provide preferred embodiments for illustrating the description and should not be seen as limiting the scope of invention.

DETAILED DESCRIPTION

Figure 1:
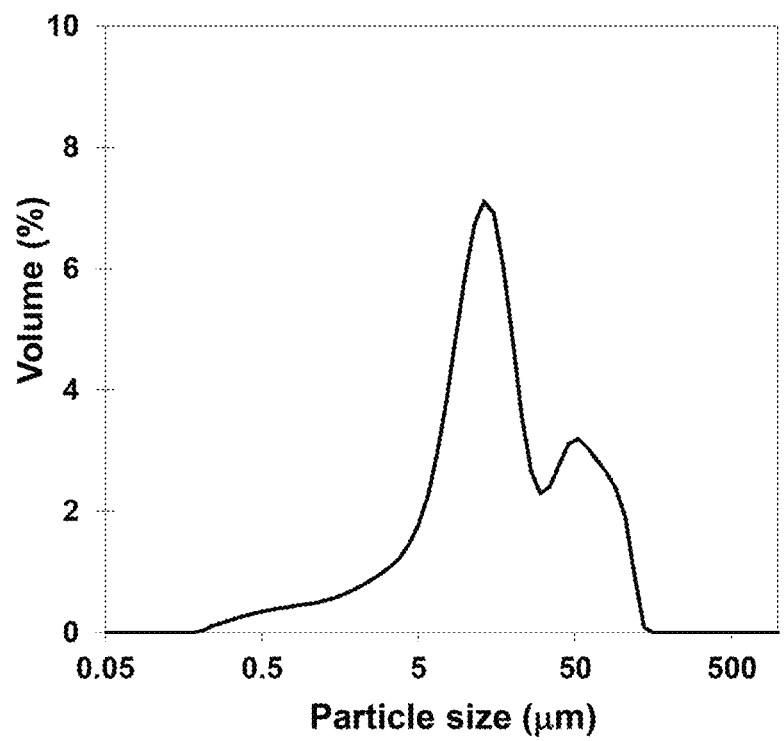
FIG. 1— Particle size distribution (PSD) of an eggshell sample.

The present disclosure relates to the use of eggshell particles as a polymer thermal stabilizer, preferably as a poly(vinyl chloride) (PVC) thermal stabilizer; also to a flexible material comprising a multi-layered PVC-based material, method of obtaining and uses thereof.

Stricter environmental, clean air and waste management legislation drives the automotive industry market towards "green" chemistry and lower-VOC emissions processes/materials. Automotive composite materials must fulfil rigorous technical specifications and high performance/quality standards, in terms of long-term functionality, human/environment safety, comfort, as well as low rates of volatile organic compounds (VOC) emitted from car interior components and using cost-competitive raw materials. This disclosure uses a by-product of egg industry as an additive to improve the thermal stability and the thermal aging behaviour of flexible PVC-based car interior components, as well as to reduce VOC emissions from these materials, when compared with currently available commercial equivalents.

The degradation of PVC can occur when it is exposed to radiation and/or high temperature due to dehydrochlorination, auto-oxidation, mechanical-chemical chain scission, crosslinking and condensation reactions that may cause the release of hydrogen chloride (HCl), accompanied by the formation of polyenic sequences and cross-links in PVC chains, resulting in a rapid degradation process, usually revealed by a change in PVC colour from white to yellow or dark brown. Thermal stabilizers are used to control PVC thermal degradation. An aspect of the present subject matter disclosed the use of natural-origin thermal stabilizers to produce a thermally stable multi-layered PVC-based material replacing commercial solvent-based stabilizers. Also, the combination with expanding microspheres allows a material which is ADCA free. In an embodiment, the PVC foamed layer is preferably ADCA free and can be produced by the incorporation of chemical or physical blowing agents, more specifically microspheres.

In an embodiment, the proposed thermal stabilizer was prepared as follows: Eggshell particles/powder.

In an embodiment, eggshells were treated using a process involving four stages: washing, drying, milling and purification. The raw material was first washed several times under warm water. The washed eggshells were milled into smaller pieces using a porcelain mortar and pestle, and then dried in a vacuum oven at 100° C. for 24 h. Dried eggshells were later milled to a fine powder and passed through a sieve (size from 0.1 and 150 μm) and kept in a desiccator at room temperature. The organic biological matter was removed from eggshells using different approaches, including an acidic treatment, a thermal treatment at different temperatures, and combinations of these approaches. For the acidic treatment, the eggshell powder was immersed in an aqueous solution of acetic acid (0.5 M) until all the organic matter was removed. For the thermal treatment, eggshell powders, previously treated or not with the acidic treatment, were heated from 200° C. to 350° C.

Surprisingly the properties of eggshell particles, namely a high porosity and high surface area, allows an efficient stabilization capacity as an HCl scavenger, and consequently, high efficiency as a thermal stabilizer.

In an embodiment, the eggshell powder described herein was isolated from chicken eggs. However, other types of eggshells can be used to yield a similar powder such as shells from turkey eggs, ostrich eggs, geese eggs, quail's eggs, duck eggs, and other bird eggs.

Other thermal stabilizers can be used combined with eggshell powder, namely calcium and zinc soaps of epoxidized vegetable oils.

In an embodiment, metal soaps of epoxidized oils were prepared by metathesis in alcoholic solution following two steps: hydrolysis and precipitation. A known amount (0.01 mol) of each EVO—epoxidized vegetable oils (ELO—epoxidized linseed oil and ESO—epoxidized soybean oil) was first dissolved in 50 ml of boiling ethanol and then mixed with 20 ml of sodium hydroxide solution (20% w/v). A solution (100 ml at 30% w/v) of different metal salts (~0.1 mol) was slowly added to this mixture under continuous stirring (1500 rpm). The zinc metal salts used were zinc acetate $(Zn(Ac)_2)$ and zinc sulfate $(ZnSO_4)$, while the calcium metal salts used were calcium acetate $(Ca(Ac)_2)$, calcium nitrate $(Ca(NO_3)_2)$, and a mixture of calcium nitrate and calcium hydroxide $(Ca(NO_3)_2/Ca(OH)_2)$ or mixture of calcium acetate and calcium hydroxide $(Ca(Ac)_2/Ca(OH)_2)$ (ratio 1:0.05, at the maximum solubility of $Ca(OH)_2$ in the reaction media). The precipitated metal soaps were washed with hot deionized water followed by washing with diethyl ether and dried in a vacuum oven at 50° C. until constant weight is achieved.

In an embodiment, the heat aging is graded as 4-5, using grey scale according ISO 105-A02:1993/Cor 2:2005. In an embodiment, the heat aging of PVC films (3×2) cm was performed using a ventilated oven at 100° C. for 240 h and 500 h and evaluated through periodic colour measurements. Colour measurements were performed using a Colour Spectrophotometer: film specimens were placed on a white standard plate and the lightness/darkness (L) and chromaticity parameters "a" (red-green) and "b" (yellow-blue) were measured. Grey scale result is the evaluation of differences in colour shading of a material's appearance. Grey scale is used in the assessment of change in colour, occurring in both heat aging testing, as described in ISO 105-A02:1993/Cor 2:2005. A tool, known as a grey scale, is used to visually assess and compare the loss of colour of a specimen by identifying a half-step rating of 5 to 1. The half-step scale consists of pairings of grey colour, from 5 being good to 1 being poor. This grey scale includes also half-step scale values. Using the Spectrophotometer, three measurements were taken on different locations of each sample (3×2 cm) and the averages were used for data analysis. DL, Da, and db are the difference of initial and final values of "L", "a", and "b" during heat aging experiments.

Figure 2:
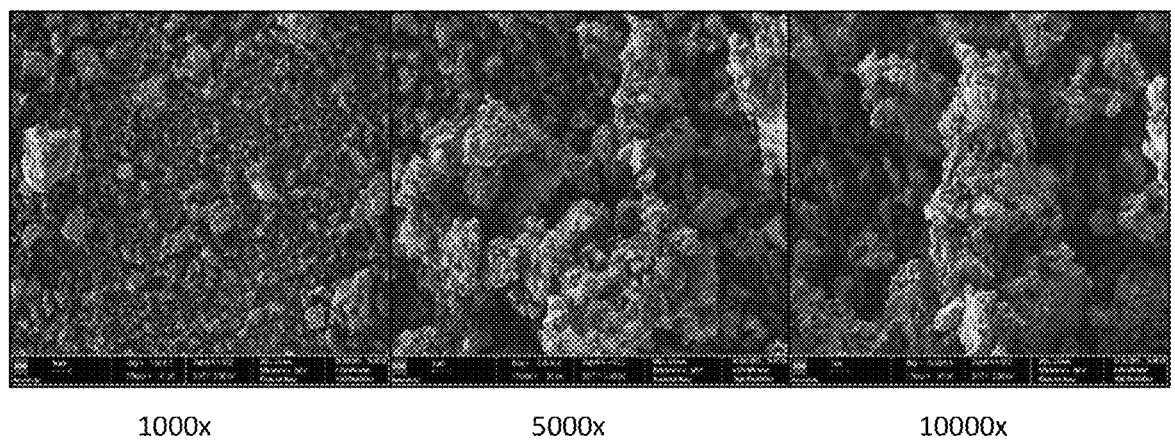
FIG. 2— SEM Images.

In an embodiment, the eggshell was milled and passed through a sieve up to 200 μm, after drying in vacuum oven at 60° C. Subsequently, a thermal treatment was performed, and, during cooling, the eggshell was stored in a desiccator with silica. All eggshell powder characterization was performed afterwards. As revealed in the particle size distribution graphic, the particle size ranges from 0.1 to 200 μM, confirming the presence of granules/agglomerates/clusters. This fact is also confirmed by the SEM images on FIG. 2.

TABLE 1

Eggshell powder properties

| Property | Treated Eggshell |
|---|---|
| Appearance | Light yellow |
| Real density (g · cm$^3$) | 2.74 ± 0.01 |
| Bulk density (g · cm$^{-3}$) | 0.67 |
| Total pore area (m$^2$ · g$^{-1}$) | 2.78 |
| Pore volume (cm$^3$ · g$^{-1}$) | 1.03 × 10$^{-2}$ |
| BET surface area (m$^2$ · g$^{-1}$) | 2.80 ± 0.04 |
| $d_{10}$ (μm) | 3.85 ± 0.08 |
| $d_{50}$ (μm) | 15.6 ± 0.60 |
| $d_{90}$ (μm) | 68.3 ± 3.41 |
| % organic matter* | 0.81 |

*Measured by TGA

In an embodiment, for a better incorporation in the PVC paste, the eggshell powder was previously dispersed into the plasticiser. However, to improve the dispersion, an extra milling was performed. This paste homogenization is crucial as it allows uniform and fluid distribution of the PVC paste in the paper substrate and it will avoid the appearance of mechanical defects on the final material (see FIG. 3).

In an embodiment, obtaining the PVC thermal stabilizer
Prepare the dispersion of eggshell powder in the plasticizer (base paste);
Milling the base paste to destroy the eggshell clusters;
Add the base paste to the PVC paste (PVC resin+Plasticizer+Additives);
Filter the prepared PVC paste;
Milling the PVC paste (optional);
For a maximum particle size/particle size of 200 μM eggshell powder (as tested) it is found that the milling of the paste (eggshell powder+plasticizer) allows removing the eggshell clusters from the final PVC film.

Figure 3:
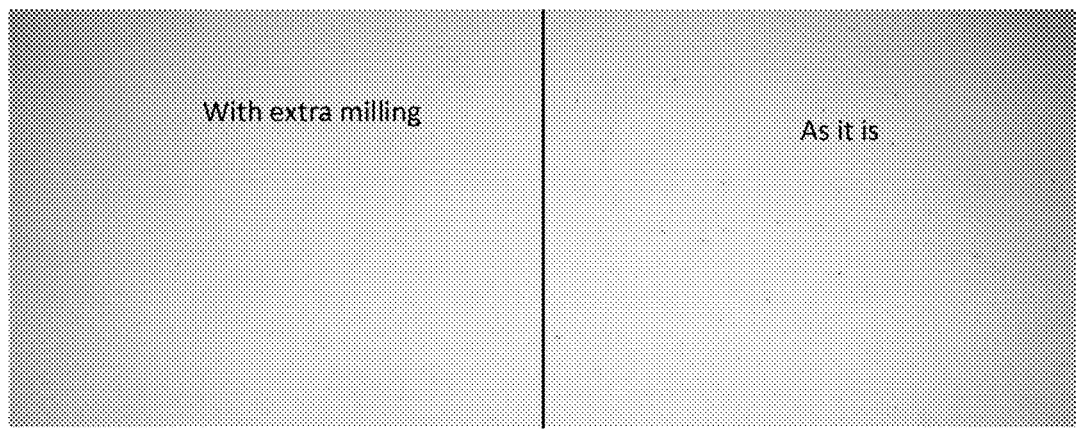
FIG. 3— Effect of milling of the paste (eggshell+plasticizer) in the PVC layer.
Figure 4:
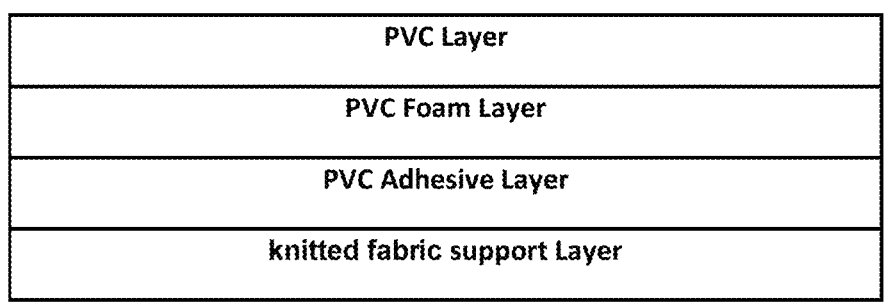
FIG. 4— Illustrates an embodiment of the reference flexible material.
Figure 5:
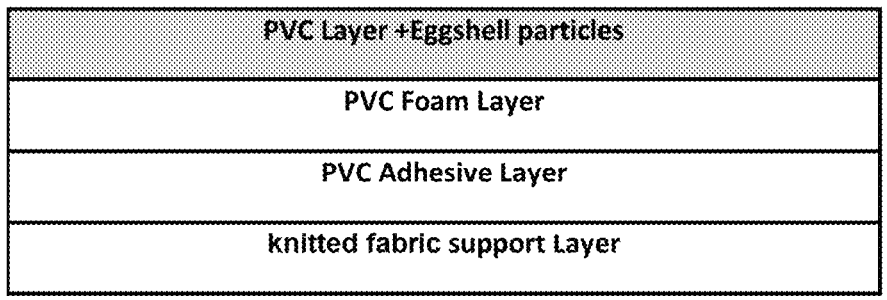
FIG. 5— Illustrates an embodiment of a version 1 of the flexible material of the present disclosure.
Figure 6:
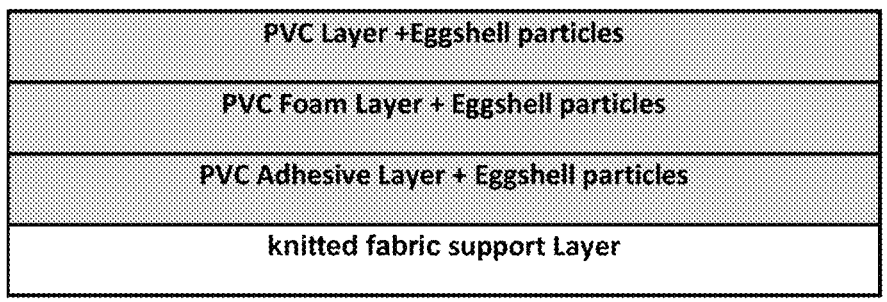
FIG. 6— Illustrates an embodiment of a version 2 of the flexible material of the present disclosure.
Figure 7:
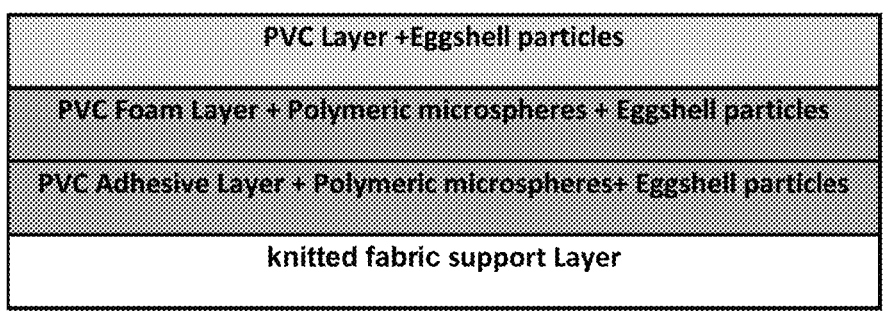
FIG. 7—Illustrates an embodiment of a version 3 of the flexible material of the present disclosure.
Figure 8:
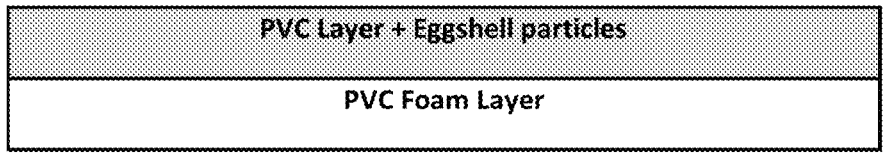
FIG. 8—Illustrates an embodiment of the material of the present disclosure.
Figure 9:
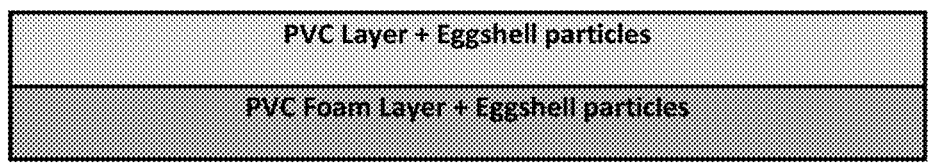
FIG. 9— Illustrates an embodiment of the material of the present disclosure.
Figure 10:
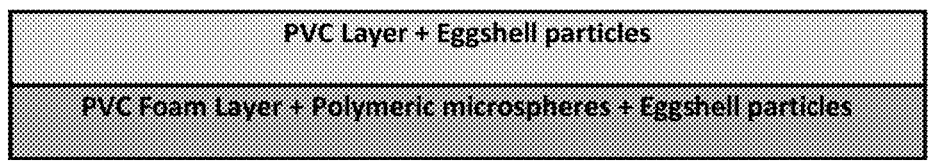
FIG. 10— Illustrates an embodiment of the material of the present disclosure.

In an embodiment, in FIG. 3 the positive influence of the extra milling of the eggshell on the quality of the PVC film is visible, with the destruction of the formed clusters.

In an embodiment, the eggshell powders were characterized for their true density, pore size distribution, surface area, particle size distribution and morphological structure. The true density of the particles was measured by helium pycnometry (Accupyc 1330 Micromeritics, Micromeritics Instrument, USA). The pore size distribution, total pore area and bulk density of the particles were measured by mercury porosimetry (Autopore IV Micromeritics, Micromeritics Instrument, USA) after purging the samples for 5 minutes at 50 μm Hg to remove adsorbed water and other impurities. The surface area and the pore volume of the particles were determined by nitrogen adsorption (Micromeritics, model ASAP 2000, 20Q-34001-01) using the Brunauer-Emmett-Teller (BET) method and Barrett-Joyner-Halenda (BJH) method, respectively. The average particle size and size distribution of the particles were measured by Laser Diffraction Spectroscopy (LDS) (Mastersizer 2000, Malvern Instruments, UK) with the solid particles dispersed at 1% (wt/wt) in milli-Q water with 1% (v/v) of Tween® 20. The microstructure of the particles was analyzed by Scanning Electron Microscopy (SEM) (Jeol JSM-5310, Japan) on gold-coated samples with an operating voltage of 10 kV.

The results of the following tables are based on the following methods:
Volatile Organic Compounds (VOC) and semi-volatile components (FOG): VDA 278:2011;
Semi-volatile components: assessed by DIN 75201-B:2011 and VDA 278:2011; Colour fastness: ISO 105-B06:1998/Amd 1:2002, Cond.3;
Heat aging and thermal stability: Evaluation according ISO 105-A02:1993/Cor 2:2005.

TABLE 2

Colour fastness of the evaluated composites/materials

| | Colour Fastness | | | | | |
|---|---|---|---|---|---|---|
| | 1 cycle ≥7 grade | | 3 cycles ≥4 grade | | 5 cycles ≥4 grade | |
| Ref. | Db* | Grade | Db* | Grade | Db* | Grade |
| Version 0 | −0.10 | 7 | 0.03 | 4-5 | 0.10 | 4-5 |
| Version 1 | −0.2 | 7 | −0.21 | 4-5 | −0.18 | 4-5 |
| Version 2 | −0.26 | 7 | −0.25 | 4-5 | −0.07 | 4-5 |
| Version 3 | −0.17 | 7 | −0.09 | 4-5 | 0.02 | 4-5 |

Version 0 - Reference version: Composite structure that is formed by PVC layer, PVC foam layer, PVC adhesive layer and knitted fabric support layer. All the PVC-based layers comprising calcium/zinc stabilizers.
Version 1 - Composite structure with eggshell in PVC layer.
Version 2 - Composite structure with eggshell in all layers, namely PVC layer and intermediate layers.
Version 3 - Composite structure with eggshell in all layers; and polymeric microspheres in the PVC foam and adhesive layer.

TABLE 3

Heat aging properties of the evaluated composites/materials

| | Heat Aging | | | |
|---|---|---|---|---|
| | 240 h @ 100° C. ≥4 grade | | 500 h @ 100° C. | |
| Ref. | Db* | Grade | Db* | Grade |
| Version 0 | 0.96 | 4 | 1.26 | 4 |
| Version 1 | 0.69 | 4-5 | 0.85 | 4-5 |
| Version 2 | 0.73 | 4-5 | 0.32 | 4-5 |
| Version 3 | 1.71 | 4 | 4.02 | 2-3 |

Version 0 - Reference version: Composite structure that is formed by PVC layer, PVC foam layer, PVC adhesive layer and knitted fabric support layer. All the PVC-based layers comprising calcium/zinc stabilizers.
Version 1 - Composite structure with eggshell in PVC layer.
Version 2 - Composite structure with eggshell in all layers, namely PVC layer and intermediate layers.
Version 3 - Composite structure with eggshell in all layers; and polymeric microspheres in the PVC foam and adhesive layer.

TABLE 4

VOCs/FOGs emissions of the evaluated composites/materials

| | Percentage of emissions compared to Version 0 VDA 278: 2011 (wt %) | |
|---|---|---|
| Ref. | VOC | FOG |
| Version 0 | 0 | 0 |
| Version 2 | −8.5 | −10.7 |

Version 0 - Reference version: Composite structure that is formed by PVC layer, PVC foam layer, PVC adhesive layer and knitted fabric support layer. All the PVC-based layers comprising calcium/zinc stabilizers.
Version 1 - Composite structure with eggshell in PVC layer.
Version 2 - Composite structure with eggshell in all layers, namely PVC layer and intermediate layers.
Version 3 - Composite structure with eggshell in all layers; and polymeric microspheres in the PVC foam and adhesive layer.

In an embodiment, the incorporation of eggshell particles does not impair light fastness since materials incorporating eggshell particles have a similar result to the reference material.

In an embodiment, the incorporation of the eggshell substantially favors the thermal aging of the materials since it has lower db values than the reference material. The material of version 2 presents a 4-5 grade in thermal aging while the Version 0 presents a 4 grade. The visual evaluation of the test pieces after aging is carried out according to the grey scale (ISO 105-A02:1993/Cor 2:2005) comparing with non-aged specimen and placed side by side, on a metal plate with an angle of 45°, centred on the laboratory light chamber (on illuminant D65) and comparing with the grey scale.

In an embodiment, the eggshell incorporation induces a slight decrease in the Volatile Components Emission (VOC) according to VDA 278:2011 and induces a substantial decrease in the emission of semi-volatile components (FOG) assessed by DIN 75201-B:2011 and VDA 278:2011, compared to the standard material.

Furthermore, where the claims recite a composition, it is to be understood that methods of using the composition for any of the purposes disclosed herein are included, and methods of making the composition according to any of the methods of making disclosed herein or other methods known in the art are included, unless otherwise indicated or unless it would be evident to one of ordinary skill in the art that a contradiction or inconsistency would arise.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A material comprising:
    a poly(vinyl chloride), PVC, layer comprising eggshell particles, wherein the eggshell particle size ranges from 0.1-200 μm,
    an intermediate layer or a plurality of intermediate layers;
    a support layer selected from the group consisting of: fabric, knitted fabric, and foam;
    wherein the PVC layer is bound to the intermediate layer or plurality of intermediate layers and the support layer;
    wherein the amount of eggshell particles of the PVC layer is up to 20% ($wt_{eggshell}/wt_{PVC\ layer}$); and
    wherein the material is resistant to impact and flexing according to standard VDA 230-225:2014.

2. The material of claim 1, wherein the plurality of intermediate layers is a foam layer and/or an adhesive layer.

3. The material of claim 1, wherein the amount of eggshell particles of the PVC layer is up to 10% ($wt_{eggshell}/wt_{PVC\ layer}$).

4. The material of claim 1, wherein the amount of eggshell particles of the PVC layer is from 0.2-5% ($wt_{eggshell}/wt_{PVC\ layer}$).

5. The material of claim 1, wherein the eggshell particle size is 1 to 50 μm.

6. The material of claim 1, wherein the material has a heat aging grade of 4-5.

7. The material of claim 1, wherein the eggshell particles d50 is from 1.0 to 20 μm.

8. The material of claim 2, wherein the foam layer further comprises eggshell particles; and/or the adhesive layer further comprises eggshell particles.

9. The material of claim 8, wherein the amount of eggshell particles of the foam layer/adhesive layer is from 0.2-5% ($wt_{eggshell}/wt_{foam\ layer}$).

10. The material of claim 8, wherein the poly(vinyl chloride) layer, and/or the foam layer and/or adhesive layer comprises polymeric microspheres.

11. The material of claim 10, wherein the polymeric microspheres are an expandable material containing a hydrocarbon with a low boiling point and a thermoplastic shell.

12. The material of claim 11, wherein the microsphere particle diameter is from 1-50 μm.

13. The material of claim 1, wherein any layer comprises sublayers.

14. An article comprising the material of claim 1, wherein the article is upholstery or a seat or door panel or automotive interior trim.

15. The material of claim 1, wherein the amount of volatile organic compounds or semi-volatile organic components emitted by the material is reduced by 5 to 25% compared to commercial equivalents.

* * * * *